J. S. & R. Porter.

Alarm-Lock.

No. 3120 Reissued Sept. 15, 1868.

Inventor

J. S. Porter

R. Porter

Per Munn & Co

Attorneys.

Witnesses

Wm Dean Overall

J. A. Service

United States Patent Office.

JAMES S. PORTER AND RUSSEL PORTER, OF WATERFORD, NEW YORK.

*Letters Patent No.* 62,683, *dated March* 5, 1867; *reissue No.* 3,120, *dated September* 15, 1868.

IMPROVEMENT IN ALARM-LOCKS.

The Schedule referred to in these Letters Patent and making part of the same.

TO ALL WHOM IT MAY CONCERN:

Be it known that we, JAMES S. PORTER and RUSSEL PORTER, of Waterford, in the county of Saratoga, and State of New York, have invented new and useful "Improvements in Locks;" and we do hereby declare that the following is a full, clear, and exact description thereof, which will enable others skilled in the art to make and use the same, reference being had to the accompanying drawings, forming part of this specification.

The present invention consists—

First, of the combination, with a lock, of a pistol, in such a manner that when a key is placed in the lock, and turned, for the purpose of locking or unlocking it, the pistol, if loaded, and its hammer set, will be discharged, thus operating as an alarm.

Second, in arranging a cam or other stop in the lock-casing, in such a manner that it can be brought to bear against the bit of the key, if in the lock, to hold it from being turned.

In the accompanying plate of drawings, our improvements in locks are illustrated—

Figure 1:
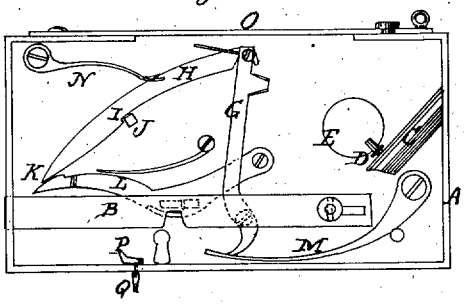

Figure 1 being a view of the inside of the lock, and

Figure 2:
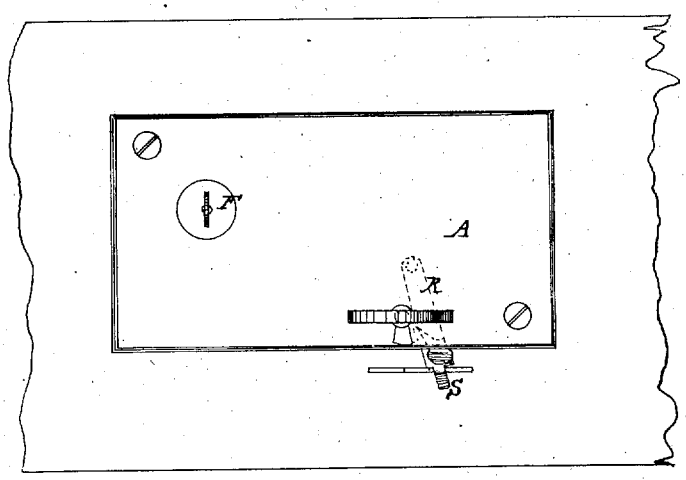

Figure 2 a view of the outside of the lock-casing.

Similar letters of reference indicate like parts.

A, in the drawings, represents the lock-casing, and B the sliding bolt of the same, which may be arranged in any of the usual modes now practised therefor.

C, a pistol-barrel, secured upon the inside of lock-casing A at one end, with its muzzle opening to the outside of the casing, so that the barrel can be loaded or charged from the outside of the lock. This pistol-barrel C, at or near its inner end, is provided with a nipple, D, to receive a percussion-cap, for the explosion of its contents, when charged.

E, a hole, made in one of the side-plates to the lock-casing, opposite the nipple D, and F a screw-stopper or plug for closing it. Through this hole, the percussion-cap is placed upon the nipple.

G, a hammer, for exploding the cap on the nipple D, and, consequently, the charge in the pistol. This hammer is hung upon a fulcrum on the inside of the lock-casing, and at one end is hung or pivoted to a latch, H, that, when the hammer is to be set, is interlocked, by its notch I, with a fixed pin, J, resting by its tail-end K upon the trigger-lever L, which is so hung in the lock-casing as to be operated by the key, when placed in the key-hole of the lock, and turned, in such a manner as to throw the latch H off of the pin J, and thus, setting the hammer G free, allow its spring M to throw it down and upon the nipple of the pistol with sufficient force to discharge the contents of the same. The latch H is provided with a spring, N, to hold it firmly engaged with the pin J.

To enable the hammer to be set, as above explained, the upper edge or side of the lock-casing is provided with a slide or cover, O, in a position which, when opened, will allow the latch H to be engaged with the pin.

P, a cam, hung in the lock-casing, and projecting, by its handle Q, below the same, which cam is of such form, that, when turned toward the key-hole of the lock, it can be brought to bear against the side of the key therein, and thus firmly holding it, prevent its being turned until swung out of the way.

To cover the key-hole, and thus prevent the insertion of a key in the lock from the outside of the door to which the lock is attached, when there is no key in the lock, we have hung upon the inside of the lock a plate or guard, R, in such a position that when taken by its handle S, projecting below the under side of the lock, it can be swung across the key-hole, and thus cover or close the same.

T, a raised rib, fixed in position upon the outside of the lock-casing, for the key-hole-cover plate R to pass or move over it, as it is swung by its handle, to cover or uncover the key-hole, whereby, when left over the key-hole, it will be bound, and thus held from being moved from the outside of the lock.

In lieu of the rib T, other holding-devices may be employed, as, for instance, a notched rib or flange, into which the cover-plate may be inserted or embedded, for being held so that it cannot be moved from the outside of the door.

What we claim as our invention, and desire to have secured by Letters Patent, is—

1. The cam or stop P, which, by being properly set, offers an obstruction to the turning of the key, substantially as described.

2. The pistol C, hammer G, latch H, and trigger L, when all arranged and combined within the interior of a lock-casing, provided with a cover, O, and plug, F, substantially in the manner and for the purpose described.

JAMES S. PORTER,
RUSSEL PORTER.

Witnesses:
GILES S. BRISBIN,
DAVID FERE.